United States Patent
Sakaguchi et al.

(10) Patent No.: US 9,017,575 B2
(45) Date of Patent: Apr. 28, 2015

(54) PHOSPHORESCENT PHOSPHOR AND PHOSPHORESCENT PIGMENT

(75) Inventors: Tomoya Sakaguchi, Hiratsuka (JP); Chisako Higuchi, Hiratsuka (JP)

(73) Assignee: Nemoto Lumi-Materials Company Limited, Tokyo (JP)

( * ) Notice: Subject to any disclaimer, the term of this patent is extended or adjusted under 35 U.S.C. 154(b) by 182 days.

(21) Appl. No.: 13/639,432

(22) PCT Filed: Jun. 6, 2011

(86) PCT No.: PCT/JP2011/062896
§ 371 (c)(1),
(2), (4) Date: Oct. 4, 2012

(87) PCT Pub. No.: WO2011/155428
PCT Pub. Date: Dec. 15, 2011

(65) Prior Publication Data
US 2013/0020535 A1 Jan. 24, 2013

(30) Foreign Application Priority Data

Jun. 11, 2010 (JP) .................. 2010-133656
Mar. 18, 2011 (JP) .................. 2011-061246

(51) Int. Cl.
*C09K 11/77* (2006.01)

(52) U.S. Cl.
CPC ................. *C09K 11/7792* (2013.01)

(58) Field of Classification Search
CPC .................................. C09K 11/7792
USPC ................................ 252/301.4 R
See application file for complete search history.

(56) References Cited

U.S. PATENT DOCUMENTS

| | | | |
|---|---|---|---|
| 5,424,006 A | 6/1995 | Murayama et al. | |
| 5,686,022 A | 11/1997 | Murayama et al. | |
| 6,117,362 A * | 9/2000 | Yen et al. ............... | 252/301.4 R |
| 6,267,911 B1 | 7/2001 | Yen et al. | |
| 7,422,704 B2 | 9/2008 | Hirata et al. | |
| 7,427,365 B2 | 9/2008 | Hirata et al. | |
| 7,658,866 B2 * | 2/2010 | Murazaki et al. ...... | 252/301.4 R |

(Continued)

FOREIGN PATENT DOCUMENTS

EP    2 135 916 A2    12/2009
JP    7 11250         1/1995

(Continued)

OTHER PUBLICATIONS

International Search Report Issued Aug. 23, 2011 in PCT/JP11/62896 Filed Jun. 6, 2011.

*Primary Examiner* — Matthew E Hoban
(74) *Attorney, Agent, or Firm* — Oblon, McClelland, Maier & Neustadt, L.L.P.

(57) ABSTRACT

An object of the present invention is to provide a phosphorescent phosphor having an excellent afterglow luminance after 10 to 12 hours after sunset under the outdoor excitation conditions. The phosphorescent phosphor is represented by the formula $(Sr_{1-a-b-x-y}Mg_aBa_bEu_xDy_y)Al_2O_4$, wherein a satisfies a relation $0.02 \leq a \leq 0.1$, b satisfies a relation $0.03 \leq b \leq 0.15$, x satisfies a relation $0.001 \leq x \leq 0.04$, y satisfies a relation $0.004 \leq y \leq 0.05$, and (a+b) satisfies a relation $0.08 \leq (a+b) \leq 0.2$. The phosphorescent phosphor has an excellent afterglow luminance after a long period of period of time in a manner most suitable for outdoor applications.

9 Claims, 3 Drawing Sheets

(56) References Cited

U.S. PATENT DOCUMENTS

| | | | |
|---|---|---|---|
| 8,470,200 B2 * | 6/2013 | Kimura et al. | 252/301.4 R |
| 2007/0096058 A1 | 5/2007 | Hirata et al. | |
| 2011/0101274 A1 | 5/2011 | Kimura et al. | |
| 2011/0291050 A1 | 12/2011 | Kimura et al. | |

FOREIGN PATENT DOCUMENTS

| | | |
|---|---|---|
| JP | 8 116845 | 5/1996 |
| JP | 8 127772 | 5/1996 |
| JP | 2010 098426 | 9/2010 |
| WO | 2010 007970 | 1/2010 |

* cited by examiner

PHOSPHORESCENT PHOSPHOR AND PHOSPHORESCENT PIGMENT

TECHNICAL FIELD

The present invention relates to a phosphorescent phosphor. In particular, the present invention relates to a phosphorescent phosphor having an excellent afterglow luminance when used outdoors.

BACKGROUND ART

In general, the afterglow time of a phosphor is extremely short, and the emission of a phosphor rapidly decays when external excitation is ceased. However, in rare cases, even after the cessation of external excitation, some phosphors maintain afterglow of a level perceivable with the naked eye for a considerably long period of time (from a few tens of minutes to a few hours); such a phosphor is referred to as a phosphorescent phosphor or a phosphorescent material in discrimination of such a phosphor from common phosphors.

Examples of the known phosphorescent phosphors include: sulfide phosphors such as CaS:Bi (purple-blue emission), CaSrS:Bi (blue emission), ZnS:Cu (green emission) and ZnCdS:Cu (yellow-orange emission). Any of these sulfide phosphors suffers from a problem such that the phosphors are chemically unstable or poor in light resistance. Even when the zinc sulfide phosphorescent phosphors are used for luminous watches, there are practical problem such that the afterglow time allowing the naked eye to perceive the time shown by the watches is approximately 30 minutes to 2 hours.

Accordingly, the present applicants have invented a phosphorescent phosphor having an afterglow lasting for a far longer period of time than commercially available sulfide phosphors, and further, being chemically stable and excellent in light resistance over a long period of time. Specifically, the present inventors have invented a phosphorescent phosphor comprising, as a matrix, a compound represented by $MAl_2O_4$, wherein M represents at least one or more metal elements selected from the group consisting of calcium, strontium and barium, and have been granted a patent (see, for example, Patent Literature 1).

The invention of the aluminate phosphorescent phosphor described in Patent Literature 1 has an afterglow lasting for a far longer period of time than conventional sulfide phosphorescent phosphors. Further, the aluminate phosphorescent phosphor is a phosphorescent oxide phosphor, and hence is chemically stable and excellent in light resistance; consequently, it comes possible to provide a long-afterglow phosphorescent phosphor applicable to various applications.

Additionally, for the purpose of responding to the needs of safety applications in low illumination intensity environments such as indoor type safety signs for escape guidance, the present applicants have proposed a phosphorescent phosphor having a high afterglow luminance even under the low illumination intensity conditions (see, for example, Patent Literature 2).

The invention described in Patent Literature 2 has satisfied the needs under the low illumination intensity conditions such as the indoor conditions. However, there have been demanded phosphorescent phosphors suitable for outdoor applications as alternative applications, in particular, such as applications to information signs, safety signs and guide signs placed outdoors. In other words, demanded are phosphorescent phosphors having a high afterglow luminance after 10 to 12 hours after sunset under the conditions that the excitation due to the sunlight is provided in the daytime up until sunset.

Such use of the sunlight as an excitation source of the phosphorescent phosphors results in the dependence of the illumination intensity on the weather. However, according to the reports on the examination of the matter such as the excitation conditions in outdoor applications, it has been reported that the sunlight can be evaluated as the ultraviolet ray irradiation quantity irrespective of whether the weather is fine or cloudy. For the purpose of achieving a quasi-reproduction of the ultraviolet radiation intensity in the daytime up until sunset, it is recommended that a xenon lamp is used as a light source, and irradiation at an ultraviolet radiation intensity of 400 $\mu W/cm^2$ is performed for 60 minutes or more and 180 minutes or less (see Non Patent Literature

CITATION LIST

Patent Literature

Patent Literature 1: Japanese Patent No. 2543825
Patent Literature 2: International Publication No. 2005/044945

Non Patent Literature

Non Patent Literature 1: "A Study of High Luminance Phosphorescent Outdoor Escape Route Sign," Committee for Studying Standards for High Function Signs and Others for Fire Fighting and Disaster Prevention, Section Meeting on High Luminance Phosphorescence, Conference on High Luminance Phosphorescence, March, 2007 (in Japanese).

SUMMARY OF INVENTION

Technical Problem

As described above, there has been demanded a phosphorescent phosphor being placed outdoors and having an excellent afterglow luminance after 10 to 12 hours after sunset.

For the purpose of fulfilling the need for such a phosphorescent phosphor, an object of the present invention is to provide a phosphorescent phosphor having an excellent afterglow luminance after 10 to 12 hours under the conditions of the outdoor excitation.

Solution to Problem

The present inventors made various studies for the purpose of solving the aforementioned technical problem, and consequently have discovered the following phosphorescent phosphors each having a specific composition. Specifically, the present inventors discovered the phosphorescent phosphors each having a specific composition and an excellent afterglow luminance after a long period of time after excitation, in particular, after 10 to 12 hours after excitation when the excitation is performed under the excitation conditions equivalent to the conditions of outdoor excitation performed until the sunset, namely, under the irradiation for 60 minutes with a xenon lamp at an ultraviolet radiation intensity of 400 $\mu W/cm^2$.

The phosphorescent phosphor according to a first aspect of the present invention is represented by the general formula, $(Sr_{1-a-b-x-y}Mg_aBa_bEu_xDy_y)Al_2O_4$, wherein a satisfies a relation, $0.02 \leq a \leq 0.1$, b satisfies a relation, $0.03 \leq b \leq 0.15$, x satisfies a relation, $0.001 \leq x \leq 0.04$, y satisfies a relation, $0.004 \leq y \leq 0.05$, and (a+b) satisfies a relation, $0.08 \leq (a+b) \leq 0.2$.

The adoption of the aforementioned composition results in a phosphorescent phosphor having an excellent afterglow luminance after a long period of time in a manner most suitable for outdoor applications.

The phosphorescent phosphor according to a second aspect of the present invention is represented by the general formula, $(Sr_{1-a-c-x-y}Mg_aCa_cEu_xDy_y)Al_2O_4$, wherein a satisfies a relation, $0.02 \leq a \leq 0.1$, c satisfies a relation, $0.05 \leq c \leq 0.1$, x satisfies a relation, $0.001 \leq x \leq 0.04$, and y satisfies a relation, $0.004 \leq y \leq 0.05$.

The adoption of the aforementioned composition results in a phosphorescent phosphor having an excellent afterglow luminance after a long period of time in a manner most suitable for outdoor applications.

The phosphorescent phosphor according to a third aspect of the present invention is a phosphorescent phosphor in which in the phosphorescent phosphor according to the first aspect, part of barium (Ba) is replaced with calcium (Ca).

Replacement of part of barium with calcium in the phosphorescent phosphor according to the first aspect also results in a phosphorescent phosphor having an excellent afterglow luminance after a long period of time in a manner most suitable for outdoor applications.

The phosphorescent pigment according to a fourth aspect of the present invention is a mixture composed of the phosphorescent phosphor according to at least any one of the first to third aspects and an inorganic blue-emitting phosphor.

Mixing of the phosphorescent phosphor according to at least any one of the first to third aspects and an inorganic blue-emitting phosphor results in a phosphorescent pigment more whitened in object-color.

The phosphorescent pigment according to a fifth aspect of the present invention is a pigment in which in the phosphorescent pigment according to the fourth aspect, the inorganic blue-emitting phosphor is at least one of $Sr_{10}(PO_4)_6Cl_2$:Eu or (Ba, Ca)$MgAl_{10}O_{17}$:Eu.

Adoption of at least one phosphor of the aforementioned two phosphors as the inorganic blue-emitting phosphor results in a more excellent phosphorescent pigment whitened in object-color.

Advantageous Effects of Invention

According to the phosphorescent phosphor according to any one of the first to third aspects, it is possible to obtain a phosphorescent phosphor having an excellent afterglow luminance after a long period of time after excitation, in particular, after 10 to 12 hours after excitation when the phosphorescent phosphor is excited under the excitation conditions equivalent to the conditions of outdoor excitation performed until the sunset, and thus being suitable for outdoor applications.

According to the phosphorescent pigment according to the fourth or fifth aspect, it is possible to obtain a phosphorescent pigment more whitened in object-color, in addition to the excellent features of the aforementioned phosphorescent phosphors.

DESCRIPTION OF EMBODIMENTS

Figure 1:
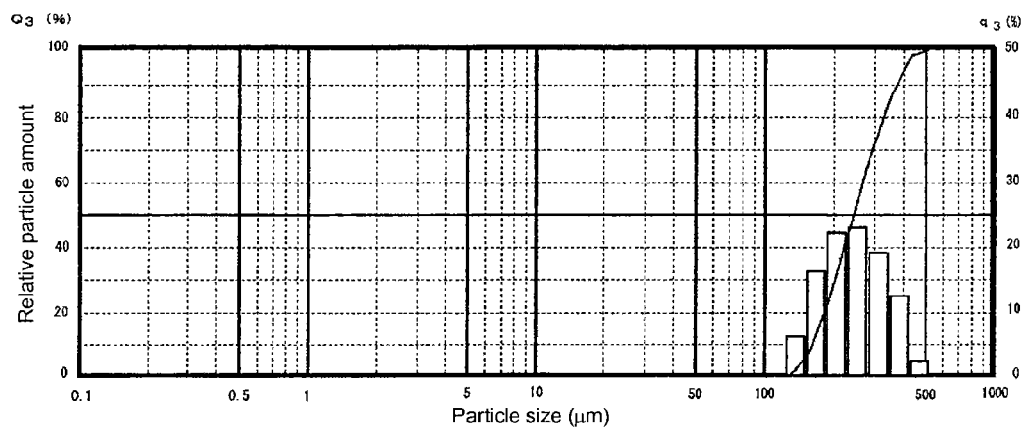
FIG. 1 is a graph showing the particle size distribution of the phosphorescent phosphor of an embodiment of the present invention (sample 1-(10)).

Hereinafter, a process for producing a phosphorescent phosphor in an embodiment of the present invention is described.

First, as phosphorescent phosphor raw materials, the following raw materials are prepared: a strontium (Sr) raw material such as strontium carbonate ($SrCO_3$); a magnesium raw material such as magnesium oxide (MgO) or basic magnesium carbonate; a barium raw material such as barium carbonate ($BaCO_3$); a calcium (Ca) raw material such as calcium carbonate ($CaCO_3$); an aluminum raw material such as alumina ($Al_2O_3$); a raw material of europium (Eu) as an activator such as europium oxide ($Eu_2O_3$); and a raw material of dysprosium (Dy) as a coactivator such as dysprosium oxide ($Dy_2O_3$). These phosphor raw materials and, for example, boric acid ($H_3BO_3$) as a flux are weighed to predetermined amounts, and are sufficiently mixed by using a ball mill mixer or the like to yield a raw material mixed powder.

The mixed powder is filled in a heat-resistant vessel such as an alumina crucible, placed in an electric furnace, and fired in a temperature range of 1200° C. or higher and 1800° C. or lower, preferably from 1350° C. or higher and 1600° C. or lower for 2 hours or more and 10 hours or less, preferably, 3 hours or more and 8 hours or less, in a reducing atmosphere.

Examples of the reducing atmosphere include: a nitrogen $N_2$+hydrogen $H_2$ mixed gas and carbon monoxide gas. Alternatively, a reducing atmosphere may also be formed by performing the firing with carbon powder such as activated carbon or graphite placed on the mixed powder.

After firing, the mixed powder is cooled down to room temperature over 2 to 10 hours. The resulting fired product is ground and sieved to yield a phosphorescent phosphor having a predetermined particle size.

In the above description, carbonates and oxides are quoted as the examples of the phosphor raw materials; however, any compounds other than the quoted compounds can be used as the phosphor raw materials as long as such compounds are decomposed into oxides at high temperatures. As an example of the flux, boric acid is quoted; however, boron compounds other than boric acid can also be used. Moreover, a selection of the conditions, such as the elevation of the firing temperature, also allows the phosphorescent phosphor to be produced without using any flux.

Next, as the examples of the foregoing embodiment, the phosphorescent phosphor of the present invention and the characteristics thereof are described.

Example 1

As the raw materials, the following were weighed: 121.06 g of strontium carbonate ($SrCO_3$) (0.82 mol in terms of Sr); 4.72 g of basic magnesium carbonate (a lot having a MgO content of 42.7% was used) (0.05 mol in terms of Mg); 19.73 g of barium carbonate ($BaCO_3$) (0.1 mol in terms of Ba); 101.96 g of alumina ($Al_2O_3$) (2 mol in terms of Al), 1.76 g of europium oxide ($Eu_2O_3$) (0.01 mol in terms of Eu), and 3.73 g of dysprosium oxide ($Dy_2O_3$) (0.02 mol in terms of Dy). Additionally, as a flux, 7.5 g of boric acid ($H_3BO_3$) (approximately 3% of the mass of the raw materials), and these raw materials and the flux were sufficiently mixed by using a ball mill.

The resulting mixture was filled in an alumina crucible, and fired at 1400° C. for 4 hours in a reducing atmosphere formed with a mixed gas composed of 97% of nitrogen $N_2$ gas and 3% of hydrogen $H_2$ gas (flow rate: 25 liters/hr).

Subsequently, the mixture was cooled down to room temperature over approximately 3 hours, and the resulting fired product was successively subjected to a grinding step and a sieving step (passage through a 40-mesh sieve) to yield a target phosphorescent phosphor. The resulting phosphorescent phosphor is referred to as the sample 1-(10). The sample 1-(10) can be represented as $(Sr_{0.82}Mg_{0.05}Ba_{0.1}Eu_{0.01}Dy_{0.02})Al_2O_4$.

Figure 2:
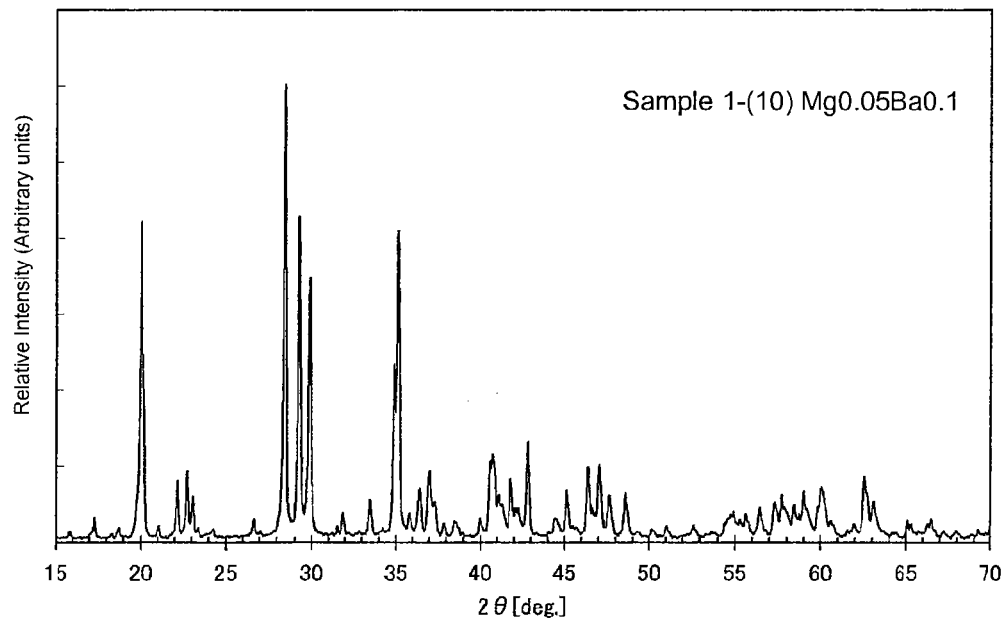
FIG. 2 is a powder X-ray diffraction chart of the phosphorescent phosphor of the embodiment of the present invention (sample 1-(10)).
Figure 3:
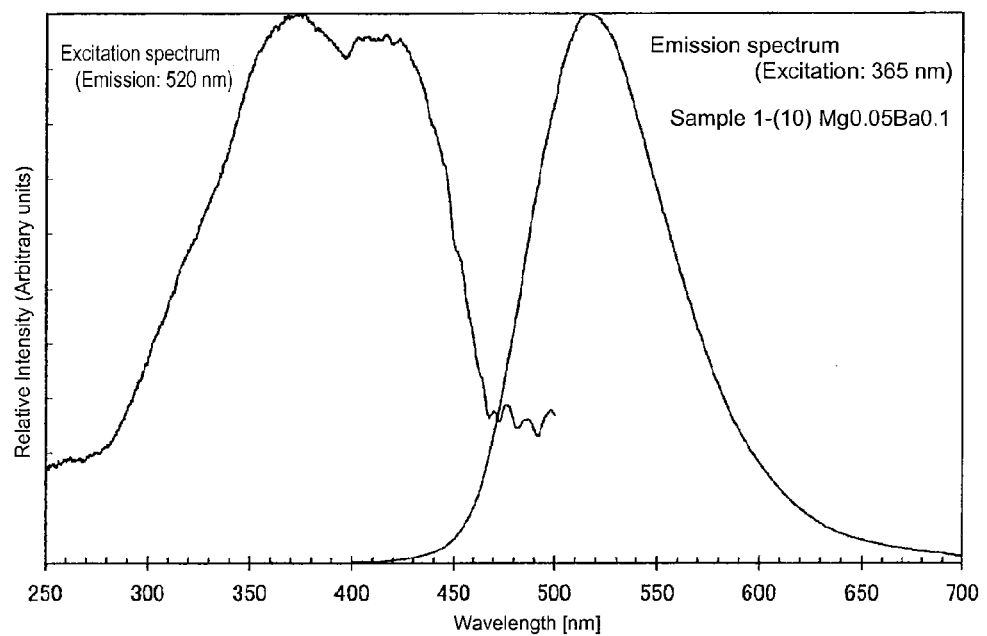
FIG. 3 is a graph showing the excitation spectrum and the emission spectrum of the phosphorescent phosphor of the embodiment of the present invention (sample 1-(10)).

The resulting sample 1-(10) was first subjected to a particle size distribution measurement with a laser diffraction particle size distribution analyzer (Model: SALD-2100, manufactured by Shimadzu Corp.). The results thus obtained are shown in FIG. 1. The sample 1-(10) was also subjected to a powder X-ray diffraction analysis with an X-ray diffractometer (Model: XRD-6100, manufactured by Shimadzu Corp.) using a Cu-tube. The resulting powder X-ray diffraction chart is shown in FIG. 2. As can be seen from the obtained results, the matrix concerned was a $SrAl_2O_4$ crystal. The sample 1-(10) was also subjected to a measurement of an excitation spectrum and an emission spectrum with a spectrofluorometer (Model: F-4500, manufactured by Hitachi, Ltd.). The results thus obtained are shown in FIG. 3.

In the same manner as described above, the sample 1-(1) to the sample 1-(9) and the sample 1-(11) to the sample 1-(18) were synthesized in each of which the amounts of strontium (Sr), magnesium(Mg) and barium(Ba) were varied as shown in Table 1, and Comparative Example 1 was also synthesized as a sample in which neither magnesium nor barium was added.

TABLE 1

| Samples | Sr [mol] | Mg [mol] | Ba [mol] | Eu [mol] | Dy [mol] |
|---|---|---|---|---|---|
| Comparative Example 1 | 0.97 | 0 | 0 | 0.01 | 0.02 |
| Sample 1-(1) | 0.95 | 0.02 | 0 | 0.01 | 0.02 |
| Sample 1-(2) | 0.92 | 0.05 | 0 | 0.01 | 0.02 |
| Sample 1-(3) | 0.87 | 0.1 | 0 | 0.01 | 0.02 |
| Sample 1-(4) | 0.89 | 0.05 | 0.03 | 0.01 | 0.02 |
| Sample 1-(5) | 0.84 | 0.1 | 0.03 | 0.01 | 0.02 |
| Sample 1-(6) | 0.87 | 0.05 | 0.05 | 0.01 | 0.02 |
| Sample 1-(7) | 0.82 | 0.1 | 0.05 | 0.01 | 0.02 |
| Sample 1-(8) | 0.87 | 0 | 0.1 | 0.01 | 0.02 |
| Sample 1-(9) | 0.85 | 0.02 | 0.1 | 0.01 | 0.02 |
| Sample 1-(10) | 0.82 | 0.05 | 0.1 | 0.01 | 0.02 |
| Sample 1-(11) | 0.8 | 0.07 | 0.1 | 0.01 | 0.02 |
| Sample 1-(12) | 0.77 | 0.1 | 0.1 | 0.01 | 0.02 |
| Sample 1-(13) | 0.67 | 0.2 | 0.1 | 0.01 | 0.02 |
| Sample 1-(14) | 0.8 | 0.02 | 0.15 | 0.01 | 0.02 |
| Sample 1-(15) | 0.77 | 0.05 | 0.15 | 0.01 | 0.02 |
| Sample 1-(16) | 0.75 | 0.07 | 0.15 | 0.01 | 0.02 |
| Sample 1-(17) | 0.67 | 0.1 | 0.2 | 0.01 | 0.02 |
| Sample 1-(18) | 0.62 | 0.05 | 0.3 | 0.01 | 0.02 |

The afterglow luminance characteristics of these resulting sample 1-(1) to the sample 1-(18) and Comparative Example 1 were examined. In particular, on the assumption of outdoor applications, the afterglow luminance characteristics were examined under the excitation conditions achieving a quasi-reproduction of the ultraviolet radiation intensity in the day-time up until sunset.

First, each of the powders of the samples and Comparative Example 1 was filled in an aluminum vessel and preliminarily heated in a dark place at 100° C. for approximately 1 hour to eliminate the afterglow. The powders of the samples and Comparative Example 1 were excited by irradiation with light having an ultraviolet radiation intensity of 400 $\mu W/cm^2$ for 60 minutes, wherein a xenon lamp was used as an excitation light source, and the light from the xenon lamp was regulated so as to have an ultraviolet radiation intensity of 400 $\mu W/cm^2$ on an ultraviolet radiation intensity meter (Ultraviolet Ray Intensity Meter UM-10, manufactured by Konica Minolta Holdings, Inc.) (light receiver: UM-400). For each of the samples and Comparative Example 1, the afterglow luminances after 5 minutes, 5 hours, 10 hours and 12 hours after excitation were measured by using a luminance meter (Chromaticity Luminance Meter, BM-5A, manufactured by Topcon Corp.). The results thus obtained are shown in Table 2, wherein the relative afterglow luminances of the sample 1-(1) to the sample 1-(18) are shown by taking the afterglow luminances of Comparative Example 1 as 100.

TABLE 2

| Samples | Mg [mol] | Ba [mol] | after 5 min | after 5 hr | after 10 hr | after 12 hr |
|---|---|---|---|---|---|---|
| Comparative Example 1 | 0 | 0 | 100 | 100 | 100 | 100 |
| Sample 1-(1) | 0.02 | 0 | 95 | 95 | 98 | 97 |
| Sample 1-(2) | 0.05 | 0 | 105 | 109 | 111 | 110 |
| Sample 1-(3) | 0.1 | 0 | 100 | 103 | 104 | 103 |
| Sample 1-(4) | 0.05 | 0.03 | 109 | 160 | 161 | 158 |
| Sample 1-(5) | 0.1 | 0.03 | 106 | 144 | 156 | 154 |
| Sample 1-(6) | 0.05 | 0.05 | 129 | 179 | 180 | 179 |
| Sample 1-(7) | 0.1 | 0.05 | 121 | 160 | 167 | 167 |
| Sample 1-(8) | 0 | 0.1 | 98 | 138 | 145 | 142 |
| Sample 1-(9) | 0.02 | 0.1 | 103 | 155 | 155 | 150 |
| Sample 1-(10) | 0.05 | 0.1 | 113 | 179 | 198 | 201 |
| Sample 1-(11) | 0.07 | 0.1 | 101 | 165 | 168 | 166 |
| Sample 1-(12) | 0.1 | 0.1 | 105 | 151 | 161 | 159 |
| Sample 1-(13) | 0.2 | 0.1 | 101 | 130 | 138 | 132 |
| Sample 1-(14) | 0.02 | 0.15 | 91 | 164 | 166 | 168 |
| Sample 1-(15) | 0.05 | 0.15 | 95 | 154 | 151 | 153 |
| Sample 1-(16) | 0.07 | 0.15 | 85 | 146 | 149 | 148 |
| Sample 1-(17) | 0.1 | 0.2 | 71 | 132 | 142 | 144 |
| Sample 1-(18) | 0.05 | 0.3 | 61 | 119 | 130 | 131 |

When attention is paid in particular to the afterglow luminances after 10 and 12 hours after the excitation shown in Table 2, as can be seen from Table 2, the samples each having the excellent afterglow luminances to be 150% or more respectively relative to the corresponding afterglow luminances of Comparative Example 1 are the sample 1-(4) to the sample 1-(7), the sample 1-(9) to the sample 1-(12), the sample 1-(14) and the sample 1-(15).

In the samples 1-(1) to the sample 1-(3) in each of which part of strontium was replaced only with magnesium, the case using 0.05 mol of magnesium exhibited a slight luminance improvement effect, but no significant luminance improvement effect was observed.

In the sample 1-(8) in which part of strontium was replaced only with barium in an amount of 0.1 mol, there was observed an afterglow luminance improvement larger by a factor of approximately 1.4 relative to Comparative Example 1.

To be compared with these samples, attention is now paid to the samples in which magnesium and barium were used simultaneously. The samples corresponding to the sample in which the amount of magnesium was 0.02 mol or more and 0.1 mol or less, the amount of barium was 0.03 mol or more and 0.15 mol or less, and the sum of the amount of magnesium and the amount of barium fell within a range of 0.08 mol or more and 0.2 mol or less, namely, the sample 1-(4) to the sample 1-(7), the sample 1-(9) to the sample 1-(12), the sample 1-(14) and the sample 1-(15) each have the excellent afterglow luminances after 10 and 12 hours after the excitation to be 150% or more respectively relative to the corresponding afterglow luminances of Comparative Example 1. These samples were also excellent in afterglow luminance as compared to the samples in each of which magnesium and barium were simultaneously used, but the amount of magnesium and the amount of barium fell out of at least one of the aforementioned three ranges, namely, the sample 1-(13), the sample 1-(16) to the sample 1-(18).

Among these samples, the sample 1-(10) in which the amount of magnesium was 0.05 mol and the amount of barium was 0.1 mol was the most excellent sample, and as can be seen from Table 2, the afterglow luminances of the sample 1-(10) were higher by a factor of approximately 2 than those of Comparative Example 1.

As can be seen from the above discussion, among the samples in each of which magnesium and barium were simultaneously used, the samples in each of which the amount of magnesium was 0.02 mol or more and 0.1 mol or less, the amount of barium was 0.03 mol or more and 0.15 mol or less and the sum of the amount of magnesium and the amount of barium fell within a range of 0.08 mol or more and 0.2 mol or less were phosphorescent phosphors each having an excellent afterglow luminance under the excitation conditions achieving, on the assumption of outdoor applications, a quasi-reproduction of the ultraviolet radiation intensity in the daytime up until sunset.

Next, as Example of another embodiment other than the aforementioned embodiment, the phosphorescent phosphor of the present invention in the case where calcium (Ca) is used in place of barium (Ba), and their characteristics are described.

Example 2

A sample was synthesized under the same production conditions as for the sample 1-(10) in Example 1 except that 10.01 g of calcium carbonate ($CaCO_3$) (0.1 mol in terms of Ca) was used in place of barium carbonate, and the resulting sample is referred to as the sample 2-(6). The sample 2-(6) can be represented as $(Sr_{0.82}Mg_{0.05}Eu_{0.01}Dy_{0.02})Al_2O_4$.

Figure 4:
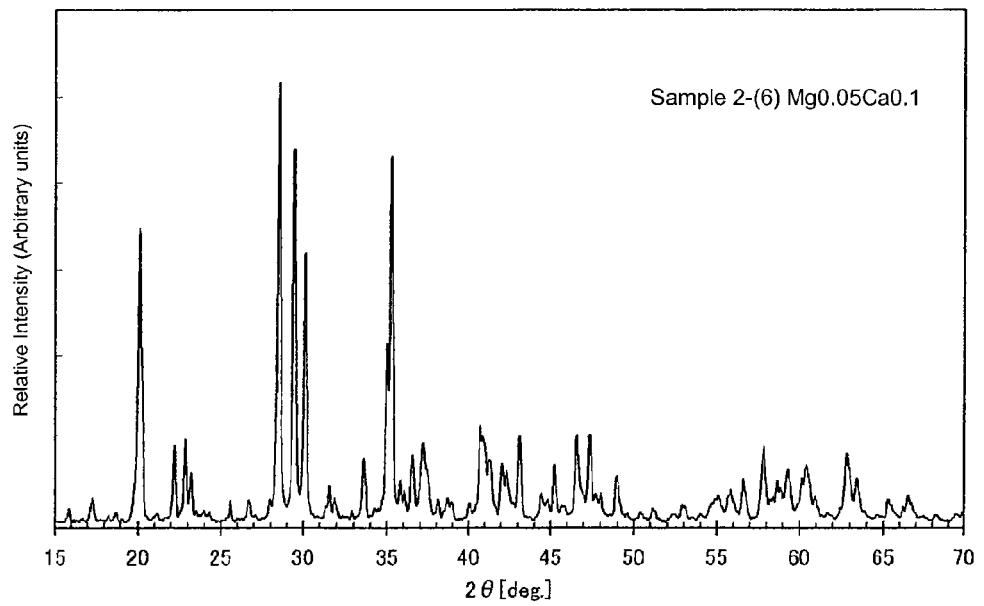
FIG. 4 is a powder X-ray diffraction chart of the phosphorescent phosphor of another embodiment of the present invention (sample 2-(6)).
Figure 5:
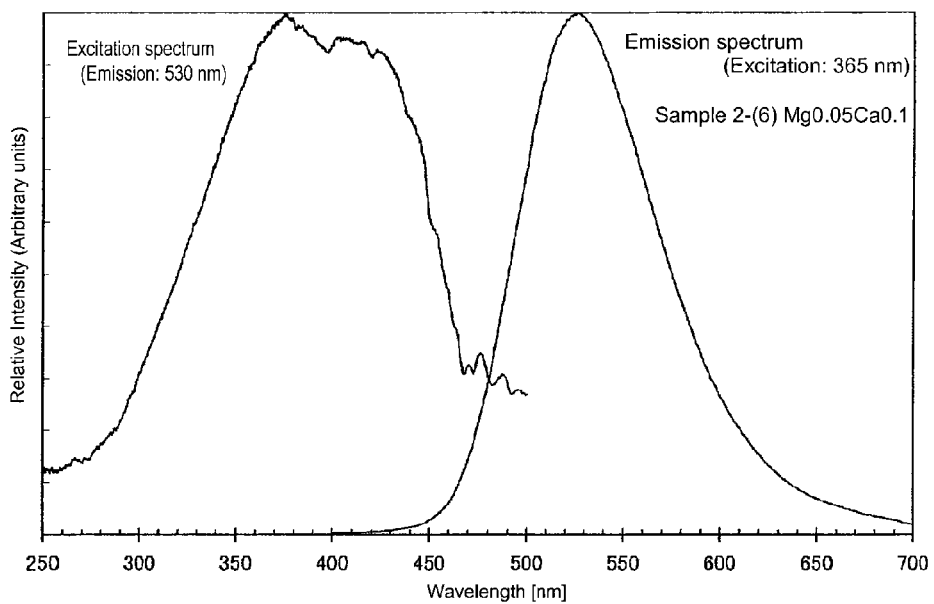
FIG. 5 is a graph showing the excitation spectrum and the emission spectrum of the phosphorescent phosphor of the another embodiment of the present invention (sample 2-(6)).

The obtained sample 2-(6) was subjected to a powder X-ray diffraction analysis with an X-ray diffractometer in the same manner as in Example 1. The resulting powder X-ray diffraction chart is shown in FIG. 4. As can be seen from the obtained results, the matrix concerned was a $SrAl_2O_4$ crystal. The sample 2-(6) was also subjected to a measurement of an excitation spectrum and an emission spectrum with a spectrofluorometer. The results thus obtained are shown in FIG. 5.

In the same manner as described above, the sample 2-(1) to the sample 2-(5), and the sample 2-(7) to the sample 2-(10) were synthesized in each of which the amounts of strontium (Sr), magnesium (Mg) and calcium (Ca) were varied as shown in Table 3.

TABLE 3

| Samples | Sr [mol] | Mg [mol] | Ca [mol] | Eu [mol] | Dy [mol] |
|---|---|---|---|---|---|
| Comparative Example 1 | 0.97 | 0 | 0 | 0.01 | 0.02 |
| Sample 2-(1) | 0.87 | 0 | 0.1 | 0.01 | 0.02 |
| Sample 2-(2) | 0.9 | 0.02 | 0.05 | 0.01 | 0.02 |
| Sample 2-(3) | 0.87 | 0.05 | 0.05 | 0.01 | 0.02 |
| Sample 2-(4) | 0.82 | 0.1 | 0.05 | 0.01 | 0.02 |
| Sample 2-(5) | 0.85 | 0.02 | 0.1 | 0.01 | 0.02 |
| Sample 2-(6) | 0.82 | 0.05 | 0.1 | 0.01 | 0.02 |
| Sample 2-(7) | 0.80 | 0.07 | 0.1 | 0.01 | 0.02 |
| Sample 2-(8) | 0.77 | 0.1 | 0.1 | 0.01 | 0.02 |
| Sample 2-(9) | 0.67 | 0.2 | 0.1 | 0.01 | 0.02 |
| Sample 2-(10) | 0.77 | 0.05 | 0.15 | 0.01 | 0.02 |

The afterglow luminance characteristics of the aforementioned sample 2-(1) to the aforementioned sample 2-(10) were examined in the same manner as in Example 1. The results thus obtained are shown in Table 4, wherein the relative afterglow luminances of the sample 2-(1) to the sample 2-(10) are shown by taking the afterglow luminances of Comparative Example 1 as 100.

TABLE 4

| Samples | Mg [mol] | Ca [mol] | after 5 min | after 5 hr | after 10 hr | after 12 hr |
|---|---|---|---|---|---|---|
| Comparative Example 1 | 0 | 0 | 100 | 100 | 100 | 100 |
| Sample 2-(1) | 0 | 0.1 | 110 | 139 | 144 | 146 |
| Sample 2-(2) | 0.02 | 0.05 | 103 | 152 | 163 | 168 |
| Sample 2-(3) | 0.05 | 0.05 | 110 | 170 | 180 | 185 |
| Sample 2-(4) | 0.1 | 0.05 | 108 | 143 | 150 | 151 |
| Sample 2-(5) | 0.02 | 0.1 | 116 | 185 | 200 | 205 |
| Sample 2-(6) | 0.05 | 0.1 | 123 | 192 | 210 | 213 |
| Sample 2-(7) | 0.07 | 0.1 | 114 | 165 | 174 | 180 |
| Sample 2-(8) | 0.1 | 0.1 | 100 | 142 | 152 | 154 |
| Sample 2-(9) | 0.2 | 0.1 | 94 | 124 | 132 | 133 |
| Sample 2-(10) | 0.05 | 0.15 | 88 | 90 | 92 | 95 |

When attention is paid in particular to the afterglow luminances after 10 and 12 hours after the excitation in the results shown in Table 4, as can be seen from Table 4, the samples each having excellent afterglow luminances to be 150% or more respectively relative to the corresponding afterglow luminances of Comparative Example 1 are the sample 2-(2) to the sample 2-(8).

In the sample 2-(1) in which a fraction of strontium was replaced only with calcium in an amount of 0.1 mol, there was observed an afterglow luminance improvement larger by a factor of approximately 1.4 relative to Comparative Example 1.

To be compared with these samples, attention is now paid to the samples in which part of strontium was replaced simultaneously with magnesium and calcium. The samples corresponding to the sample in which the amount of magnesium was 0.02 mol or more and 0.1 mol or less and the content of calcium was 0.05 mol or more and 0.1 mol or less, namely, the sample 2-(2) to the sample 2-(8) each have the excellent afterglow luminances after 10 and 12 hours after the excitation to be 150% or more respectively relative to the corresponding afterglow luminances of Comparative Example 1. These samples were also excellent in afterglow luminance as compared to the samples in each of which magnesium and calcium were simultaneously used, but the amount of magnesium and the amount of barium fell out of the aforementioned ranges, namely, the sample 2-(9) and the sample 2-(10).

Among these samples, the sample 2-(5) and the sample 2-(6) in each of which the amount of magnesium was 0.02 mol or 0.05 mol and the amount of calcium was 0.1 mol were the most excellent samples, and as can be seen from Table 4, the afterglow luminances of the sample 2-(5) and the sample 2-(6) were higher by a factor of approximately 2 than those of Comparative Example 1.

As can be seen from the above discussion, among the samples in each of which a fraction of strontium was simultaneously replaced with magnesium and calcium, the samples in each of which the amount of magnesium was 0.02 mol or more and 0.1 mol or less, and the amount of calcium was 0.05 mol or more and 0.1 mol or less were phosphorescent phosphors each having an excellent afterglow luminance under the excitation conditions achieving, on the assumption of outdoor applications, a quasi-reproduction of the ultraviolet radiation intensity in the daytime up until sunset.

The cases where magnesium and barium were used are described in Example 1, and the cases where magnesium and calcium were used are described in Example 2; additionally, the cases where a fraction of barium was replaced with calcium in Example 1 were experimentally verified to have similarly excellent afterglow luminances.

Next, the cases where the amounts of europium and dysprosium were varied are described.

Example 3

According to the compositions in terms of molar proportions shown in Table 5, samples were synthesized in the same manner as in Example 1, and the resulting samples are referred to as the sample 3-(1) to the sample 3-(8), and Comparative Example 2 to Comparative Example 5.

TABLE 5

| Samples | Sr [mol] | Mg [mol] | Ba [mol] | Ca [mol] | Eu [mol] | Dy [mol] |
|---|---|---|---|---|---|---|
| Comparative Example 2 | 0.99 | 0 | 0 | 0 | 0.005 | 0.005 |
| Sample 3-(1) | 0.84 | 0.05 | 0.1 | 0 | 0.005 | 0.005 |
| Sample 3-(2) | 0.84 | 0.05 | 0 | 0.1 | 0.005 | 0.005 |
| Comparative Example 3 | 0.945 | 0 | 0 | 0 | 0.005 | 0.05 |
| Sample 3-(3) | 0.795 | 0.05 | 0.1 | 0 | 0.005 | 0.05 |
| Sample 3-(4) | 0.795 | 0.05 | 0 | 0.1 | 0.005 | 0.05 |
| Comparative Example 4 | 0.965 | 0 | 0 | 0 | 0.03 | 0.005 |
| Sample 3-(5) | 0.815 | 0.05 | 0.1 | 0 | 0.03 | 0.005 |
| Sample 3-(6) | 0.815 | 0.05 | 0 | 0.1 | 0.03 | 0.005 |
| Comparative Example 5 | 0.92 | 0 | 0 | 0 | 0.03 | 0.05 |
| Sample 3-(7) | 0.77 | 0.05 | 0.1 | 0 | 0.03 | 0.05 |
| Sample 3-(8) | 0.77 | 0.05 | 0 | 0.1 | 0.03 | 0.05 |

The afterglow luminance characteristics of the sample 3-(1) to the sample 3-(8) and Comparative Example 2 to Comparative Example 5 were examined in the same manner as in Example 1, and the relative afterglow luminances of these samples are shown in Table 6 by taking the afterglow luminances of each of Comparative Examples as 100.

TABLE 6

| Samples | after 5 min | after 5 hr | after 10 hr | after 12 hr |
|---|---|---|---|---|
| Comparative Example 2 | 100 | 100 | 100 | 100 |
| Sample 3-(1) | 94 | 145 | 155 | 157 |
| Sample 3-(2) | 95 | 141 | 152 | 153 |
| Comparative Example 3 | 100 | 100 | 100 | 100 |
| Sample 3-(3) | 97 | 144 | 152 | 154 |
| Sample 3-(4) | 98 | 142 | 149 | 151 |
| Comparative Example 4 | 100 | 100 | 100 | 100 |
| Sample 3-(5) | 98 | 140 | 150 | 151 |
| Sample 3-(6) | 100 | 143 | 151 | 152 |
| Comparative Example 5 | 100 | 100 | 100 | 100 |
| Sample 3-(7) | 99 | 142 | 152 | 153 |
| Sample 3-(8) | 100 | 139 | 150 | 150 |

As can be seen from what has been described above, when the amount of europium is 0.005 mol or more and 0.03 mol or less and the amount of dysprosium is 0.005 mol or more and 0.05 mol or less, the replacement with magnesium and barium or the replacement with magnesium and calcium enables the afterglow luminance appropriate to the object of the present invention to be obtained.

An additional test of the case where the amount of europium was 0.04 mol verified that, as compared to the case where the amount of europium was 0.03 mol, the former case provided the afterglow luminance improvement effect nearly equivalent to the afterglow luminance improvement effect of the latter case.

The amount of europium exceeding 0.04 mol results in a tendency that the fluorescence intensity is made stronger than the afterglow intensity, and hence is undesirable for the phosphorescent phosphor as the object of the present invention; the amount of europium less than 0.005 mol provides an insufficient activator amount to result in a tendency that the afterglow luminance is reduced. The amount of dysprosium exceeding 0.05 mol unpreferably results in a tendency that the afterglow luminance itself is reduced due to a cause such as concentration quenching; the amount of dysprosium less than 0.005 mol provides an insufficient co-activator amount to result in a tendency that the afterglow luminance is reduced.

Next, as a second effect, the whitening of the object-color of the phosphorescent phosphor was examined.

As described above, the amount of europium less than 0.005 mol results in a tendency that the afterglow intensity is reduced, and on the other hand, results in a secondary effect to whiten the object-color of the phosphorescent phosphor. Also, in the case where the amount of europium was small, the effect of the use of magnesium and barium or magnesium and calcium was verified in the same manner. For the purpose of representing the object-colors of the phosphors, the whiteness and the yellowness were measured with a colorimetric color difference meter (Model TC-1500DX, manufactured by Tokyo Denshoku Co., Ltd.). The results thus obtained are shown in Table 7 and Table 8. For reference, the whiteness and the yellowness of the sample 1-(10) were 83 and 22, respectively.

TABLE 7

| Samples | Sr [mol] | Mg [mol] | Ba [mol] | Ca [mol] | Eu [mol] | Dy [mol] |
|---|---|---|---|---|---|---|
| Comparative Example 6 | 0.994 | 0 | 0 | 0 | 0.001 | 0.004 |
| Sample 3-(9) | 0.844 | 0.05 | 0.1 | 0 | 0.001 | 0.004 |
| Sample 3-(10) | 0.844 | 0.05 | 0 | 0.1 | 0.001 | 0.004 |

TABLE 7-continued

| Samples | Sr [mol] | Mg [mol] | Ba [mol] | Ca [mol] | Eu [mol] | Dy [mol] |
|---|---|---|---|---|---|---|
| Comparative Example 7 | 0.949 | 0 | 0 | 0 | 0.001 | 0.05 |
| Sample 3-(11) | 0.799 | 0.05 | 0.1 | 0 | 0.001 | 0.05 |
| Sample 3-(12) | 0.799 | 0.05 | 0 | 0.1 | 0.001 | 0.05 |
| Comparative Example 8 | 0.988 | 0 | 0 | 0 | 0.004 | 0.008 |
| Sample 3-(13) | 0.838 | 0.05 | 0.1 | 0 | 0.004 | 0.008 |
| Sample 3-(14) | 0.838 | 0.05 | 0 | 0.1 | 0.004 | 0.008 |

TABLE 8

| Samples | after 5 min | after 5 hr | after 10 hr | after 12 hr | Whiteness | Yellowness |
|---|---|---|---|---|---|---|
| Comparative Example 6 | 100 | 100 | 100 | 100 | 92 | 8 |
| Sample 3-(9) | 106 | 150 | 161 | 166 | 92 | 8 |
| Sample 3-(10) | 102 | 140 | 149 | 153 | 91 | 8 |
| Comparative Example 7 | 100 | 100 | 100 | 100 | 93 | 7 |
| Sample 3-(11) | 127 | 174 | 183 | 185 | 92 | 7 |
| Sample 3-(12) | 121 | 162 | 169 | 172 | 92 | 9 |
| Comparative Example 8 | 100 | 100 | 100 | 100 | 89 | 14 |
| Sample 3-(13) | 111 | 135 | 138 | 139 | 89 | 13 |
| Sample 3-(14) | 108 | 132 | 138 | 140 | 87 | 15 |

As can be seen from Table 7 and Table 8, even when the amount of europium was less than 0.005 mol, the replacement with magnesium and barium or the replacement with magnesium and calcium improved the afterglow luminances after long period of time. As can also be seen from Table 7 and Table 8, even when the amount of dysprosium was 0.004 mol, the afterglow luminance was similarly improved.

It can also be seen that the object-color of the phosphor becomes whitened with the decrease of the amount of europium. Further, it can also be seen that either the use of magnesium and barium or the use of magnesium and calcium little affects the whiteness and the yellowness. Consequently, it can be seen that the object-color of the phosphor (pigment) is whitened and at the same time, the afterglow luminance of the phosphor (pigment) is improved.

For the purpose of improving the aesthetic appearance and the designability, the phosphorescent phosphors more whitened in object-color are highly demanded. Phosphorescent phosphors whitened by simply decreasing the amount of europium tend to be reduced in afterglow luminance. In contrast to this, the replacement with magnesium and barium or the replacement with magnesium and calcium improves the afterglow luminance, and hence improves the practicability also in the whitened phosphorescent phosphors.

However, when the amount of europium is less than 0.001 mol, the afterglow luminance is remarkably reduced, and hence even the use of magnesium and barium or the use of magnesium and calcium does not result in a practical afterglow luminance. Also, when the amount of dysprosium is less than 0.003 mol, similarly the afterglow luminance is remarkably reduced to result in impractical afterglow luminance.

There is also a method, for the purpose of further improving the whitening of the object-color, in which a phosphorescent phosphor and an inorganic blue-emitting phosphor are mixed with each other. In this case, as the inorganic blue-emitting phosphor, for example, the following phosphors can be used: europium activated alkaline earth metal chloro apatite phosphor (for example, $Sr_{10}(PO_4)_6Cl_2$:Eu); and europium activated barium magnesium aluminate phosphor (for example, (Ba, Ca) $MgAl_{10}O_{17}$:Eu).

As the europium activated barium magnesium aluminate phosphor, phosphors having slightly high europium concentration such as a phosphor having a composition of $(Ba_{0.75}Ca_{0.075})MgAl_{10}O_{17}$:$Eu_{0.175}$ are high in whitening effect and hence are preferable. For example, the whiteness and the yellowness of the phosphor, $Sr_{10}(PO_4)_6Cl_2$:Eu were 95 and −6, respectively; and the whiteness and the yellowness of the phosphor, $(Ba_{0.75}Ca_{0.075})MgAl_{10}O_{17}$:$Eu_{0.175}$ were 98 and −2, respectively. Inorganic blue-emitting phosphors having larger magnitudes of the minus value of yellowness are more preferable.

From the viewpoint of the afterglow luminance, the small amount of the inorganic blue-emitting phosphor to be mixed is desirable. Also from this viewpoint, it can be said that the phosphorescent phosphors having relatively high value in whiteness and improved in afterglow luminance are preferable. According to applications and needs, the composition and the mixing proportion of such an inorganic blue-emitting phosphor can be appropriately regulated.

In Examples presented above, description is made on the basis of the stoichiometric composition, namely, the composition in which the ratio of the sum of the numbers of moles of the respective alkaline earth metal elements, europium and dysprosium to the number of moles of aluminum is 1:2; however, the phosphorescent phosphor can be produced on the basis of the raw material mixing ratio in which the proportion of aluminum is slightly insufficient or excessive as compared to the proportion based on the aforementioned stoichiometric ratio; even when a phosphorescent phosphor is produced with such a mixing ratio, the phosphorescent phosphor of the present invention can be produced.

Figure 6:
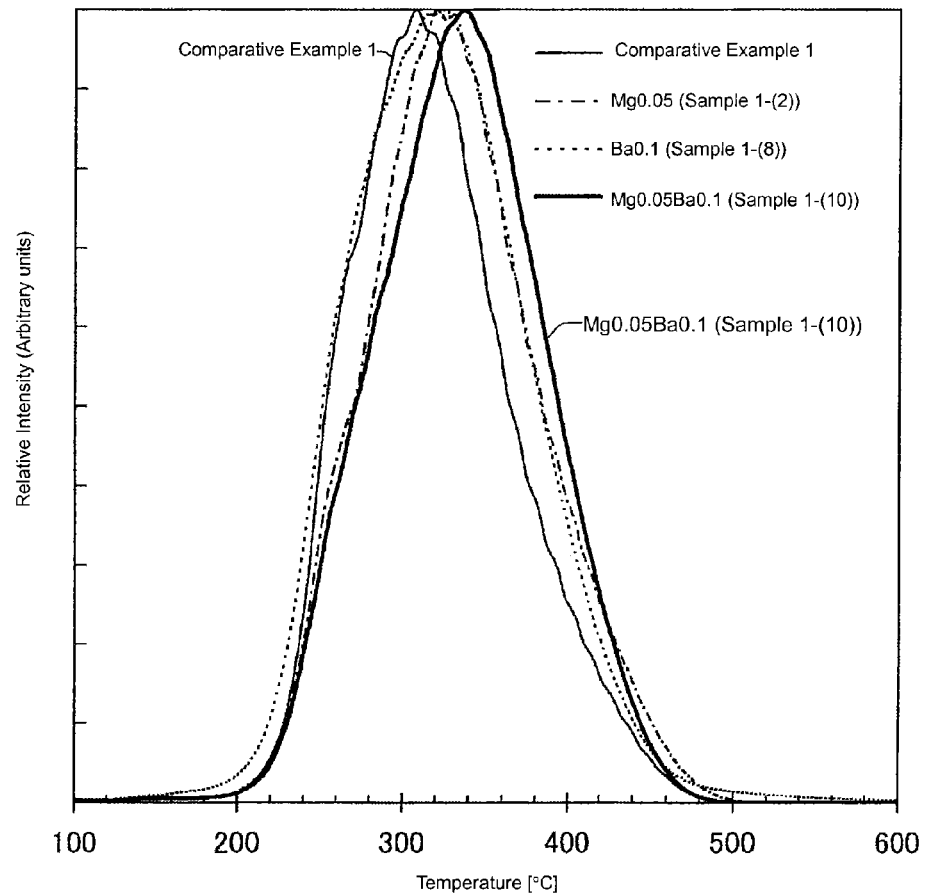
FIG. 6 is a graph showing the thermoluminescence characteristics of the phosphorescent phosphors of Comparative Example 1 and the Embodiment (sample 1-(10)).

As described above, when in the strontium aluminate phosphorescent phosphors, part of strontium is replaced simultaneously with predetermined amounts of two elements such as magnesium and barium or magnesium and calcium, the afterglow luminance after a long period of time is improved. This is conceivably because the aforementioned simultaneous replacement with two elements makes deeper the depth of the trap, and such deep trap depth improves the afterglow luminances after the long period of times, namely, after 10 and 12 hours. For example, FIG. 6 shows a graph of thermoluminescence characteristics. The peak temperatures of the thermoluminescence in the sample 1-(2) using magnesium and the sample 1-(8) using barium are slightly shifted toward higher temperatures as compared to Comparative Example 1. As can be clearly seen, the peak temperature of the sample 1-(10) of the present invention simultaneously using magnesium and barium is further shifted toward higher temperatures. The thermoluminescence characteristics and the trap depth are correlated with each other; the higher the peak temperature is, the deeper the trap depth is. As can be inferred from the thermoluminescence characteristics, the phosphorescent phosphor of the present invention, simultaneously using magnesium and barium is deeper in trap depth than conventional phosphorescent phosphors, and the deeper trap depth allows the excellent afterglow luminance to be exhibited after a long period of time.

The deep trap depth means slow release of the energy accumulated through excitation. In other words, it can be said that the fluorescence and the extremely short duration afterglow are reduced, but the afterglow after a long period of time is correspondingly increased.

For example, here is assumed a case where a phosphorescent phosphor is observed under the conditions that the ultraviolet intensity of a light source is strong such as the outdoor conditions. Conventional phosphorescent phosphors are made visible through light including green component, namely, the fluorescence emission color, and hence the object-color of the phosphors is observed to be stronger in green. However, the phosphorescent phosphor of the present invention is suppressed with respect to the fluorescence and the extremely short duration afterglow, and hence has an effect such that the object-color thereof is observed to be more white than those of conventional phosphorescent phosphors.

INDUSTRIAL APPLICABILITY

The phosphorescent phosphor of the present invention has a high afterglow luminance even after 10 to 12 hours after sunset, under the conditions that the phosphorescent phosphor is excited by the sunlight in the daytime up until sunset, and hence can be suitably used, in particular, for signs placed outdoors such as information signs, safety signs and guide signs.

Because of such a feature that the phosphorescent phosphor of the present invention maintains a high afterglow luminance after a long period of time after excitation, the applications of the phosphorescent phosphor of the present invention are not limited to the aforementioned signs and the like. The phosphorescent phosphor of the present invention can also be suitably used, for example, in applications for watches and the like requiring an afterglow luminance equal to or higher than a predetermined level even after a long period of time.

The invention claimed is:

1. A phosphorescent phosphor represented by the general formula $(Sr_{1-a-b-x-y}Mg_aBa_bEu_xDy_y)Al_2O_4$, wherein:
   a satisfies a relation $0.02 \leq a \leq 0.1$;
   b satisfies a relation $0.03 \leq b \leq 0.15$;
   x satisfies a relation $0.005 \leq x \leq 0.03$;
   y satisfies a relation $0.005 \leq y \leq 0.05$;
   (a+b) satisfies a relation $0.08 \leq (a+b) \leq 0.2$.

2. A phosphorescent phosphor represented by the general formula $(Sr_{1-a-c-x-y}Mg_aCa_cEu_xDy_y)Al_2O_4$, wherein:
   a satisfies a relation $0.02 \leq a \leq 0.1$;
   c satisfies a relation $0.05 \leq c \leq 0.1$;
   x satisfies a relation $0.005 \leq x \leq 0.03$; and
   y satisfies a relation $0.005 \leq y \leq 0.05$.

3. A phosphorescent pigment, comprising a mixture of:
   the phosphorescent phosphor according to claim 1; and
   an inorganic blue-emitting phosphor.

4. The phosphorescent pigment according to claim 3, wherein the blue-emitting phosphor comprises at least one of $Sr_{10}(PO_4)_6Cl_2$:Eu and (Ba, Ca)$MgAl_{10}O_{17}$:Eu.

5. A phosphorescent pigment, comprising a mixture of:
   the phosphorescent phosphor according to claim 2; and
   an inorganic blue-emitting phosphor.

6. The phosphorescent pigment according to claim 5, wherein the blue-emitting phosphor comprises at least one of $Sr_{10}(PO_4)_6Cl_2$:Eu and (Ba, Ca)$MgAl_{10}O_{17}$:Eu.

7. A phosphorescent phosphor represented by the general formula $(Sr_{1-a-b-c-x-y}Mg_aBa_bCa_cEu_xDy_y)Al_2O_4$, wherein:
   a satisfies a relation $0.02 \leq a \leq 0.1$;
   (a+b) satisfies a relation $0.08 \leq (a+b) \leq 0.2$;
   (b+c) satisfies a relation $0.03 \leq (b+c) \leq 0.15$;
   b satisfies a relation $0 \leq b$;
   c satisfies a relation $0 \leq c$;
   x satisfies a relation $0.005 \leq x \leq 0.03$; and
   y satisfies a relation $0.005 \leq y \leq 0.05$.

8. A phosphorescent pigment, comprising a mixture of:
   the phosphorescent phosphor according to claim 7; and
   an inorganic blue-emitting phosphor.

9. The phosphorescent pigment according to claim 8, wherein the blue-emitting phosphor comprises at least one of $Sr_{10}(PO_4)_6Cl_2$:Eu and (Ba, Ca)$MgAl_{10}O_{17}$:Eu.

* * * * *